United States Patent [19]
Fuller

[11] 3,936,218
[45] Feb. 3, 1976

[54] FLUID SYSTEMS
[75] Inventor: John Rodney Dyson Fuller, Bristol, England
[73] Assignee: Rolls-Royce (1971) Limited, London, England
[22] Filed: June 4, 1974
[21] Appl. No.: 476,336

[30] Foreign Application Priority Data
June 12, 1973 United Kingdom............ 27957/73

[52] U.S. Cl................................. 415/119; 137/207
[51] Int. Cl.².......................................... F04D 29/66
[58] Field of Search............... 415/119, 121, 47, 26; 137/207; 417/540, 542; 60/696

[56] References Cited
UNITED STATES PATENTS

| | | | |
|---|---|---|---|
| 3,146,796 | 9/1964 | Everett | 137/207 |
| 3,237,715 | 3/1966 | Peters | 137/207 |
| 3,343,560 | 9/1967 | Nankiveil | 137/207 |
| 3,398,932 | 8/1968 | Koeller | 415/119 |

Primary Examiner—C. J. Husar
Assistant Examiner—L. T. Casaregola
Attorney, Agent, or Firm—Stevens, Davis, Miller & Mosher

[57] ABSTRACT

A device for reducing the effect of "water hammer" type shocks in an hydraulic system. The system has a discontinuity in it created by a vapor-core pump, and the discontinuity, which occurs at less than full pump flow, is used to empty a succession of compartments connected in series through respective orifices.

When full pump flow is required a "water hammer" type shock is generated upon disappearance of the discontinuity and this is dissipated in a series of smaller shocks at each of the successive orifices as the series of compartments becomes filled. The maximum shock pressure to which the system is subjected is thus reduced.

4 Claims, 3 Drawing Figures

FLUID SYSTEMS

The present invention relates to hydraulic systems, and relates particularly to a device for relieving water hammer shock pressures in hydraulic systems.

In some hydraulic systems, for example reheat systems for gas turbine engines, it is necessary to supply liquid under pressure from one position to another in the system in a very short space of time. This involves columns of liquid moving at high speed within pipes, and fast acting valves to close and open passageways for the liquid, and the high accelerations and decelerations of the liquid columns give rise to shock waves moving up and being reflected back along the pipes known as water hammer shock waves. In this specification and the appended claims water hammer shock waves will be referred to as "shock waves".

The present invention provides amelioration of the shock wave effects so that the shock waves do not cause serious over-pressures in the hydraulic system.

According to the present invention there is provided an hydraulic system comprising a duct for the containment of liquid, an orifice in the wall of the duct, a compartment connected to the duct through the orifice and means for generating a discontinuity in the liquid in the duct, the arrangement being such that generation of the discontinuity causes the compartment to be substantially emptied and any shock wave propagated upon sudden disappearance of the discontinuity will be dissipated in part at the orifice and in part upon filling of the compartment.

Preferably, second and third compartments are sequentially connected to said one compartment, each connection being through a respective restricted orifice.

Embodiments of the invention will now be described, by way of example only, with reference to the accompanying drawings, in which.

Figure 1:
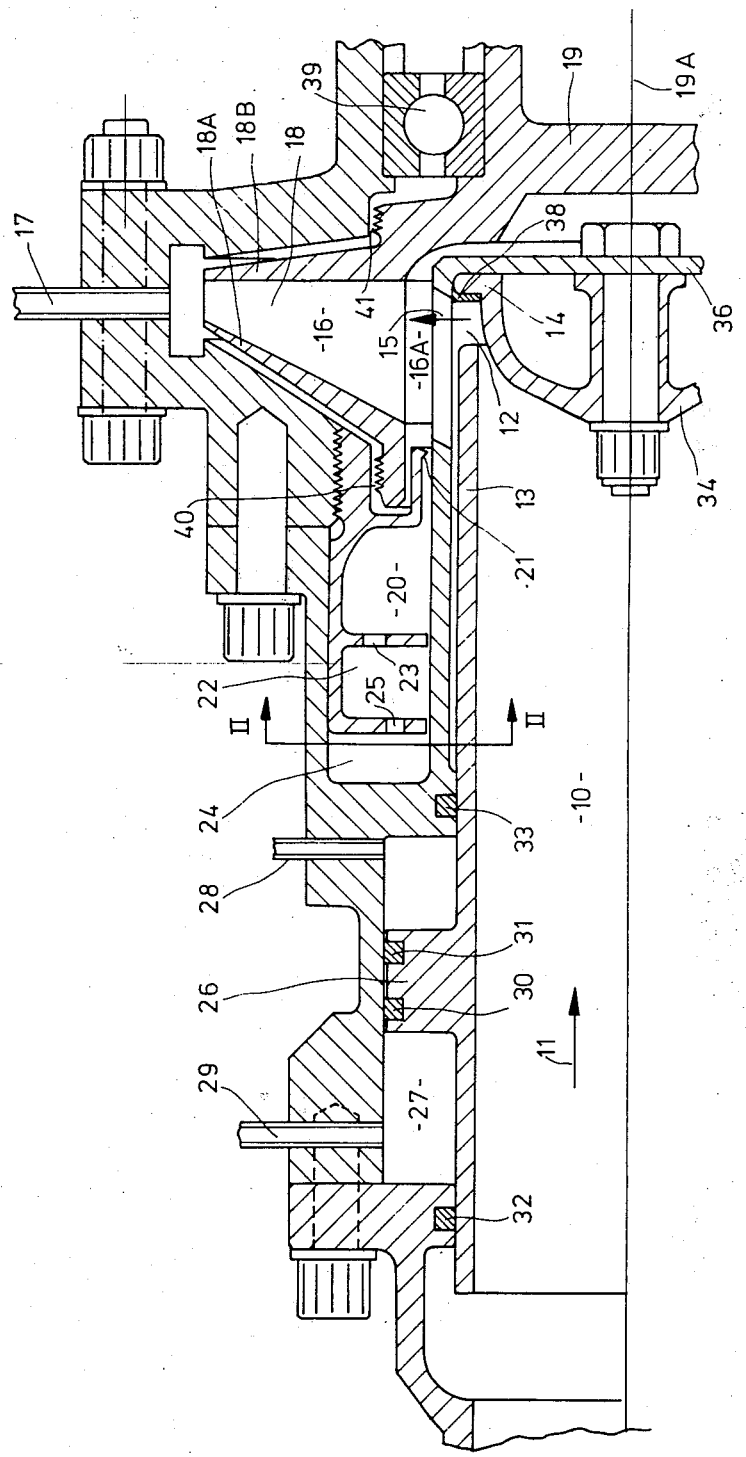
FIG. 1 is a vertical section through part of an hydraulic system.
Figure 2:
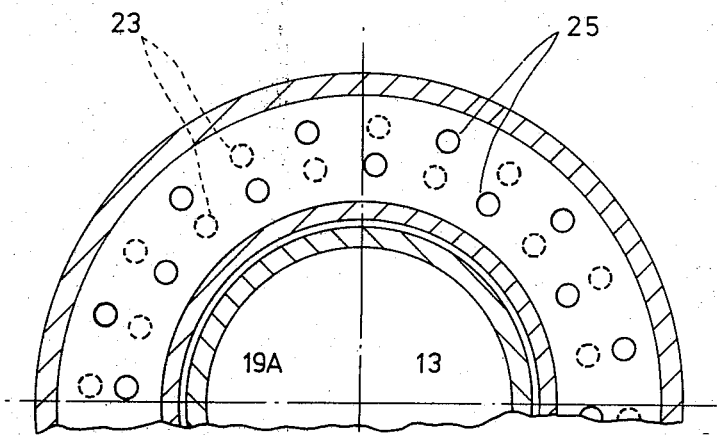
FIG. 2 is a cross-section along the line II—II of FIG. 1.

FIGS. 1 and 2 show part of a system for delivering fuel to the combustion chamber of a gas turbine engine. Fuel is drawn from a reservoir or tank (not shown) by a pump (also not shown) and is delivered to a pipe 10 in the direction of arrow 11. The rate of fuel delivery is controlled by a valve 12 comprising a cylindrical valve member 13 and an annular seat 14. Fuel delivered through the valve (in the radial direction shown at arrow 15) passes to the inlet 16A of a centrifugal pump 16 and the delivery of this pump is taken along conduit 17 directly to the burners (not shown) of the gas turbine engine.

The pump 16 is of the vapor core type, that is to say when full fuel delivery is required the valve 12 is set so as to deliver sufficient fuel to the pump inlet that the pump is substantially full. When less than full delivery is required the valve 12 reduces the delivery to the pump inlet and the pump runs less than full. The pump comprises a centrifugal impeller 18 having shrouds 18A and 18B, driven continuously from the gas turbine engine through a shaft 19 and rotating about an axis 19A. When the pump is running less than full, the impeller centrifuges outwards the fuel which is in it so that the inner part of the impeller 18, around the inlet 16A, is at low pressure and has a discontinuity in the fuel which is occupied only by fuel vapor. This is how the expression "vapour core" arises. It will be understood that, when the pump is running less than full, the fuel delivery rate of pump 16 is independent of the speed of impeller 18 (which is related to the engine speed) and is entirely controlled by the opening of valve 12.

When the pump is running less than full and the control system of the gas turbine engine calls for much increased or full flow, the valve 12 will open to allow much increased or full delivery to pump 16. This causes the column of fuel in pipe 10 to be accelerated towards pump 16 to meet the increased demand.

The increased fuel flow reaching pump 18 will initially take up the discontinuity in the pump i.e. the vapor core, and at the moment when the discontinuity is completely taken up the column of fuel in pipe 10 up to the pump 16, which will have been accelerated to a substantial velocity by this time, will almost instantaneously be slowed to the speed corresponding to the fuel delivery rate along conduit 17. This will generate shock waves in the system, which will be propagated back down pipe 10 and will cause the system to suffer instantaneous pressures which could be expected to be of the order of multiples of the system pressure: in one example the instantaneous pressure has been found to be of the order of four times the system pressure.

In order to reduce the effects of this rapid deceleration of the fuel at the pump inlet, this inlet is in communication with an annular compartment 20 through an annular orifice 21. The compartment 20 is in turn in communication with a second annular compartment 22 through a series of orifices 23 and the second compartment is in turn in communication with a third annular compartment 24 through a series of orifices 25. The series of orifices 23 and 25 each comprise a circumferential array of holes as seen in FIG. 2.

The sizes of orifices 21, 23 and 25 are so restricted and the volumes of compartments 20, 22 and 24 are so chosen that upon the discontinuity in the pump being taken up a shock wave of about one-quarter that which would otherwise occur, is generated and the fuel flows rapidly into chamber 20. Further shock waves each of about one-quarter of the amplitude which otherwise occur, are generated as each of compartments 20, 22 and 24 is sequentially filled. In this way four closely spaced shock waves of acceptably smaller amplitude are generated which the system can accept without damage.

The compartments 20, 22 and 24 have sequentially reducing volumes chosen to match the orifice sizes of orifices 21, 23 and 25, so that the pressure pulses are of about equal amplitude and equally spaced in time. Any suitable number of orifices and compartments may be used depending upon the reduction in pulse amplitude and the pulse spacing required to allow the hydraulic system to accommodate anticipated shock waves.

When the system is operating at less than full delivery so that a vapor core or discontinuity exists at inlet 16A, this discontinuity will draw fluid out of compartment 20 through orifice 21 and in turn out of the other compartments until they are all substantially empty of liquid and contain only vapor at low pressure. The disposition of orifice 21 close to inlet 16A ensures that this will happen and it will be seen that compartments 20, 22 and 24 are all closed except for their communication through their respective orifices 21, 23 and 25.

The remainder of the system illustrated provides for actuation of valve 21 and for rotation of impeller 18. Thus, the cylindrical valve member 13 has a radial extension forming piston 26 sliding in cylinder 27. A pipe 28 admits fuel (which is used as the operating fluid) under pressure to open valve 12 (by moving cylindrical member 13 along its axis 19A) and a pipe 29 admits fuel to close valve 12. Piston 26 has two piston rings 30, 31 to assist sealing and member 13 also has two rings 32, 33 for this purpose. The annular seat 14 comprises a domed member 34 bolted to stationary structure 36 of the system and carrying an annular seal 38 against which member 13 seats.

Impeller 18 and shaft 19 rotate with respect to the stationary structure of the system and are supported from this structure on bearing 39. The impeller has two labyrinth seals 40, 41 for resisting the re-circulation of fuel back from the output of impeller 18.

Figure 3:
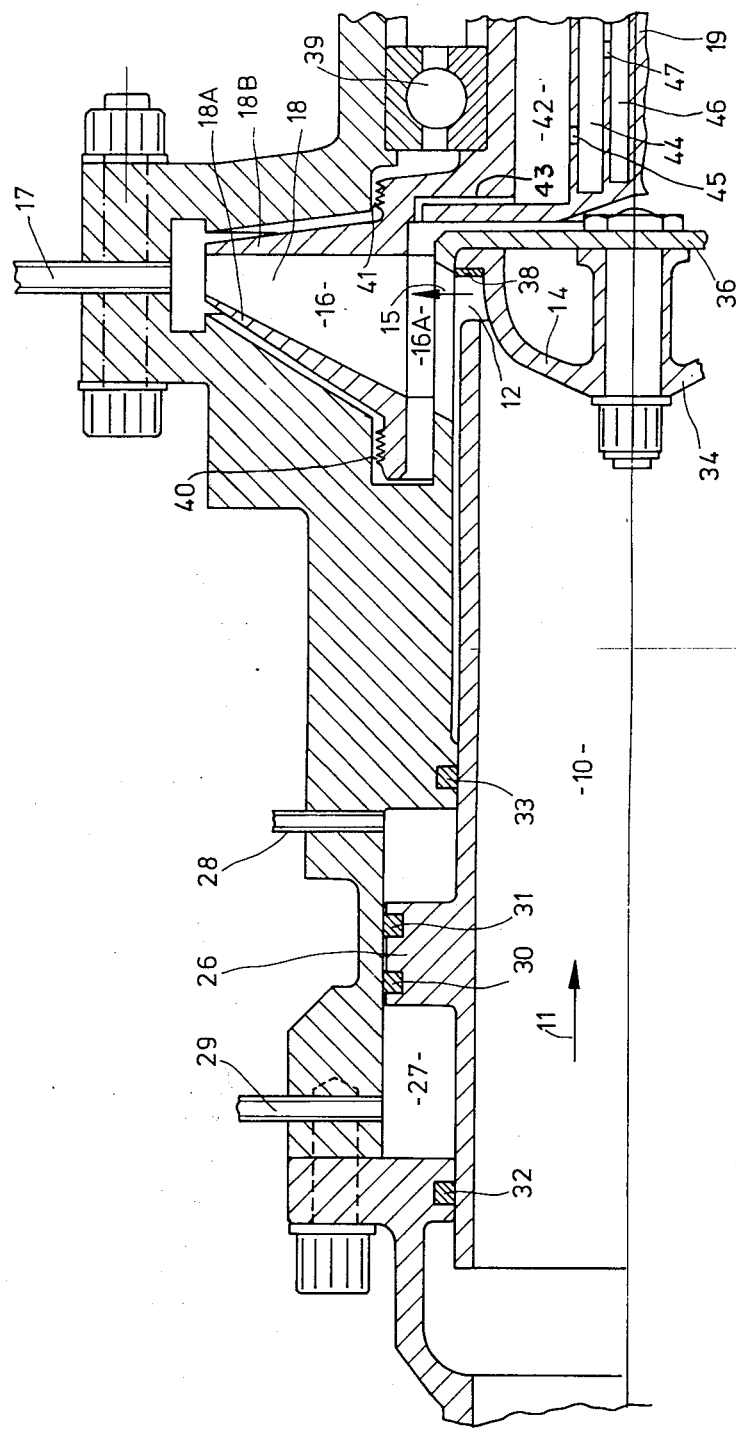
FIG. 3 is a vertical section through part of another hydraulic system.

Referring now to FIG. 3 like references have been applied to like parts shown in FIGS. 1 and 2. In this embodiment the pump inlet 16A is in communication with a compartment 42 through a passage constituting an orifice 43 both formed in the shaft 19. Compartment 42 is in communication with a second compartment 44 through a series of orifices 45 and in turn with a third compartment 46 through a series of orifices 47. The compartments 42, 44 and 46 are all annular and concentric and provide the sequential dissipation of the energy of decelerating the fuel flow in pipe 10 as described in FIGS. 1 and 2. The concentric arrangement of compartments in this embodiment assisting in the emptying of the fuel when the pump is running less than full, by centrifugal action. The compartments are sequentially smaller and the orifices chosen so as to cause substantially equal pulses of pressure.

Because the emptying of the compartments in the embodiment of FIG. 3 is ensured by centrifugal action this embodiment will operate to empty compartments 42, 44 and 46 immediately after a reduction from maximum fuel flow and the emptying of these compartments will be unaffected by any acceleration of the aircraft resulting from the sudden demand for increased fuel or by gravity.

I claim:

1. A hydraulic system comprising a duct for the containment of liquid, an orifice in the wall of the duct, a compartment connected to the duct through the orifice and means for generating a partial vacuum which causes a discontinuity in the liquid in the duct such that the discontinuity contains only liquid vapor, the orifice being disposed adjacent said means so that generation of the discontinuity causes the compartment to be substantially emptied through the orifice, and the orifice and the compartment being so sized and disposed that any shock wave propagated upon sudden disappearance of the discontinuity will be dissipated in part at the orifice and in part upon filling of the compartment, and said system further comprising a second compartment connected to the first compartment through a second orifice, the arrangement being such that generation of the discontinuity causes the second compartment to be substantially emptied through the second orifice and any shock wave propagated upon disappearance of the discontinuity will be dissipated in part at the first orifice, in part at the second orifice and in part upon filling of the second compartment.

2. A hydraulic system comprising a duct for the containment of liquid, an orifice in the wall of the duct, a compartment connected to the duct through the orifice and means for generating a partial vacuum which causes a discontinuity in the liquid in the duct such that the discontinuity contains only liquid vapor, the orifice being disposed adjacent said means so that generation of the discontinuity causes the compartment to be substantially emptied through the orifice, and the orifice and the compartment being so sized and disposed that any shock wave propagated upon sudden disappearance of the discontinuity will be dissipated in part at the orifice and in part upon filling of the compartment, and said system further comprising one or more further compartments connected in series through further respective orifices and also being arranged to be substantially emptied of liquid upon generation of the discontinuity and so that any shock wave will be dissipated in part at each of the orifices and in part at the last compartment.

3. A system according to claim 1 in which the means for generating a discontinuity comprises a vapor core-type pump.

4. A system according to claim 2 in which the means for generating a discontinuity comprises a vapor core-type pump.

* * * * *